UNITED STATES PATENT OFFICE.

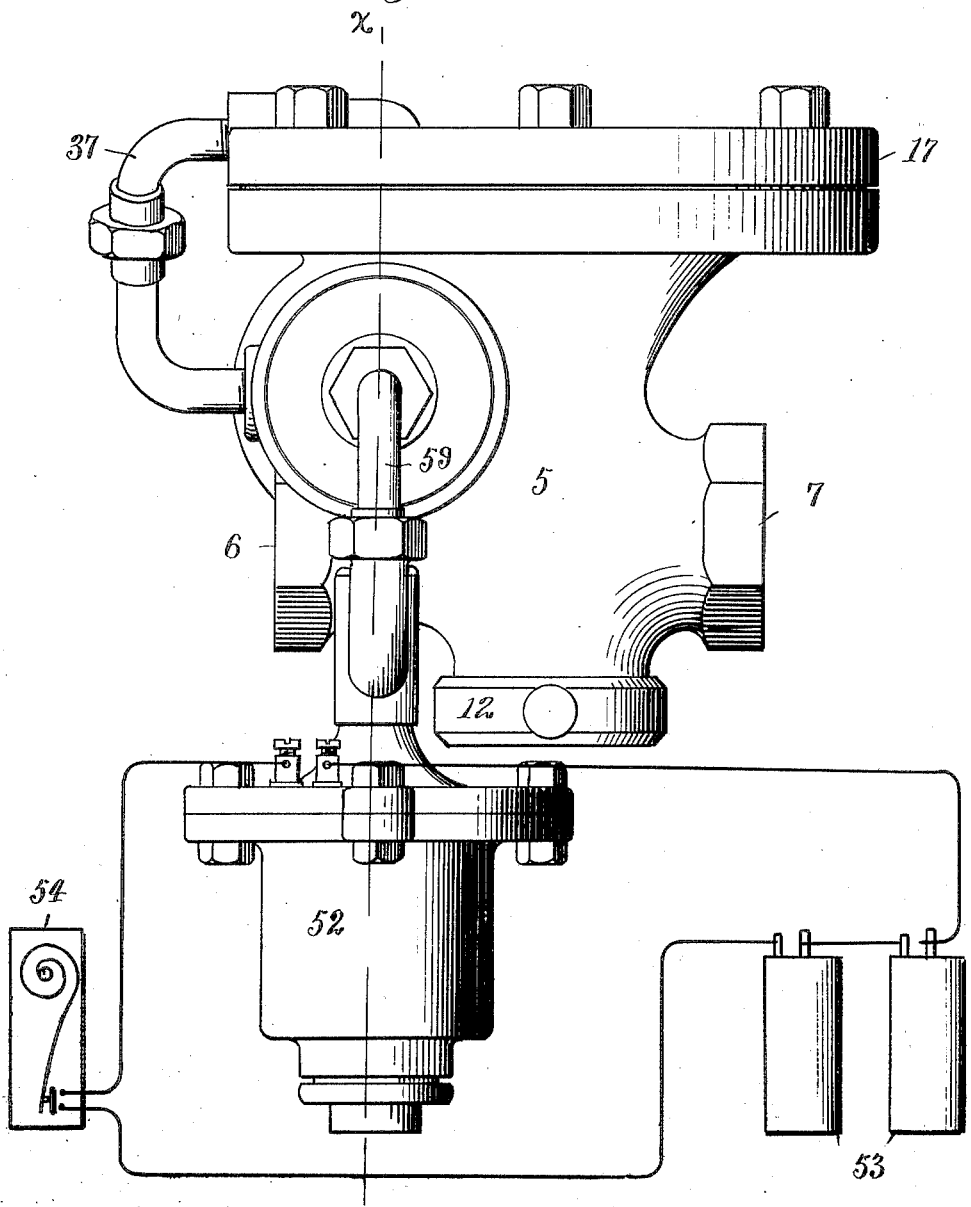

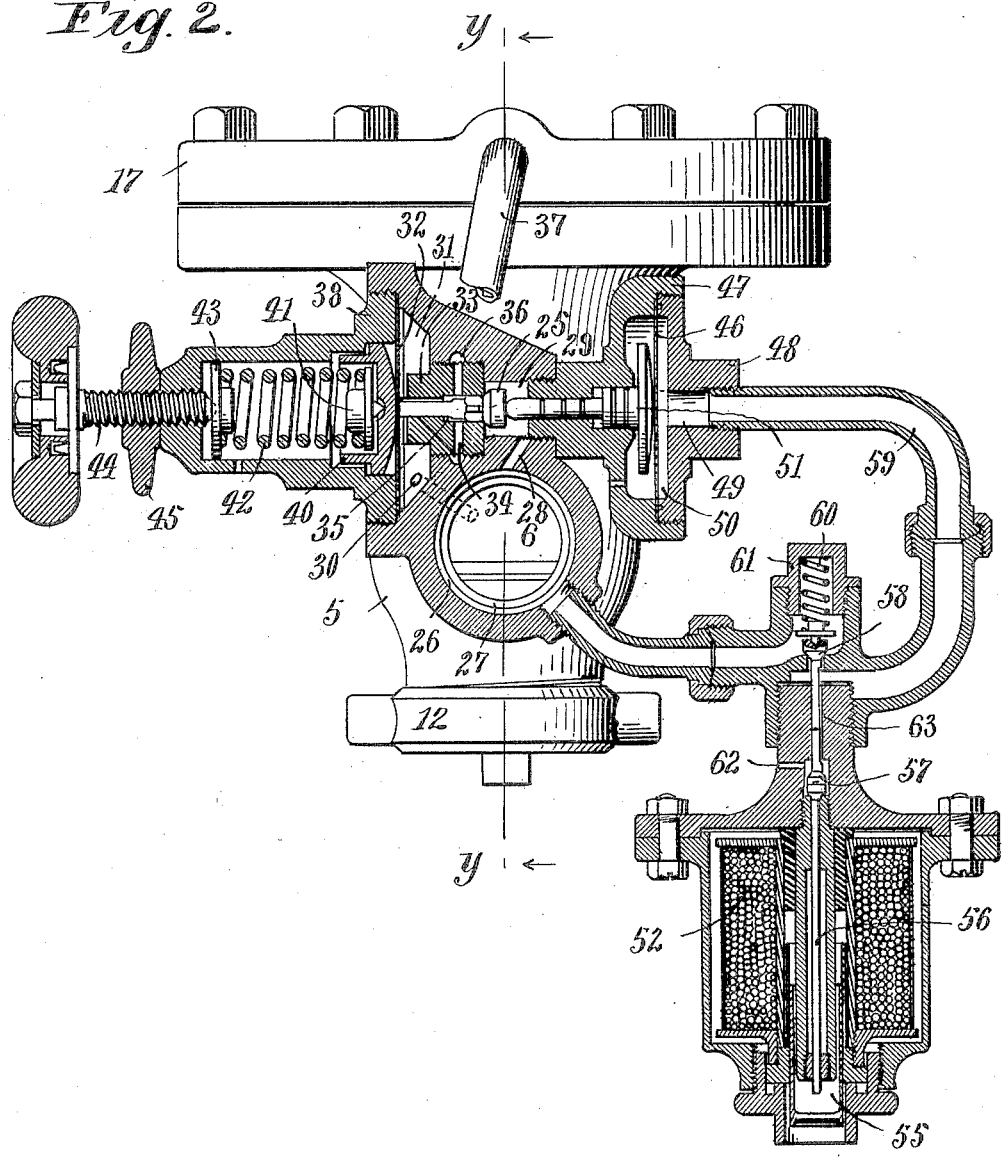

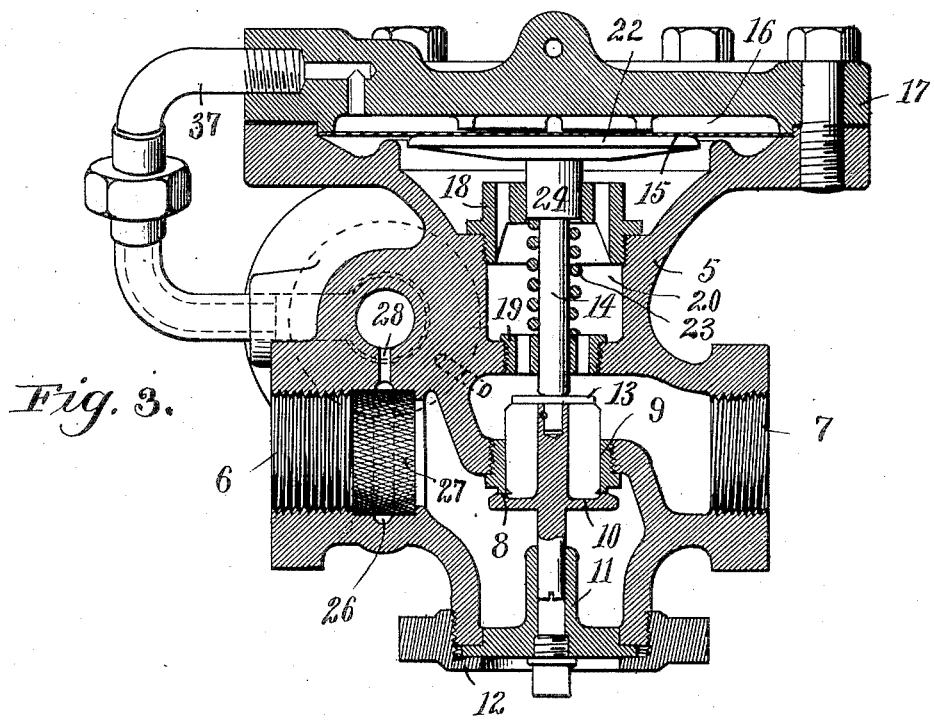

GEORGE W. COLLIN, OF BRIDGEPORT, CONNECTICUT, ASSIGNOR TO THE COLLIN VALVE CO., OF BRIDGEPORT, CONNECTICUT, A CORPORATION OF MAINE.

REGULATING-VALVE.

1,076,665.  Specification of Letters Patent.  Patented Oct. 28, 1913.

Application filed October 10, 1911. Serial No. 653,803.

*To all whom it may concern:*

Be it known that I, GEORGE W. COLLIN, citizen of the United States, and resident of Bridgeport, in the county of Fairfield and State of Connecticut, have invented certain new and useful Improvements in Regulating-Valves, of which the following is a specification.

This invention relates to improvements in regulating valves, and comprises a valve adapted for operation as a reducing valve, but also adapted for use as a shut off valve, controllable from a distance, and, if desired, automatically so controllable, the operation of the valve as a reducing valve not being interfered with by the mechanism which constitutes it a shut off valve, except as the pressure reducing mechanism is necessarily prevented from functioning during such times as the valve is caused by the shut off mechanism to completely stop flow.

As an automatic shut off valve my improved valve is particularly adapted for control by some external controlling device, such for example as a thermostat, or time switch, or hand switch. The thermostatic control of my valve has numerous advantages in various arts, for example, in the arts of vulcanizing, pasteurizing, beer treatment, lard melting, etc., as the thermostatically controlled valve is capable of regulating the flow of heating fluid so as to maintain very exactly predetermined temperatures. For similar reasons the valve is particularly suitable for thermostatically-controlled heating systems of various types.

The objects of my invention are to improve the construction of reducing valves, to so construct the valve that it shall be free from liability to derangement from any cause, to provide a reducing valve which shall operate accurately at low pressure, and with very small pressure variations, to provide for external or distant or automatic control of the valve, independent of pressure variations, and in general to make the valve simple, easy to construct and assemble, easy to inspect and clean, durable, and entirely reliable.

I will now proceed to describe my invention with reference to the accompanying drawings, illustrating one structure embodying such invention, and will then point out the novel features in claims.

In said drawings: Figure 1 shows a side elevation of my improved valve, combined with thermostatically-operated control means. Fig. 2 shows a transverse section of the valve taken on the line $x$—$x$ of Fig. 1, that is to say, through the pilot valve and operating mechanism therefor. Fig. 3 shows a cross-sectional elevation of the valve, taken on the line $y$—$y$ of Fig. 2, that is to say, through the main valve and operating mechanism thereof.

This valve may be successfully used for controlling the flow of various fluids under pressure. However, the greatest field of application for the valve is probably for the control of the flow of steam under pressure, for which service the valve has been particularly designed; and in the following description I will describe the valve as used for the control of the flow of steam under pressure; though it will be understood that the valve operates in the same manner for controlling the flow of other fluids under pressure.

In the drawings, 5 designates the main body of the valve, provided with the usual inlet 6 and outlet 7, which are shown as screw-threaded for the connection thereto of suitable steam pipes or the like. The inlet and outlet are arranged on opposite sides of the body, and the valve body is provided with the usual division wall separating the inlet and outlet chambers, which division wall has a transverse flat portion in which is removably secured a ported valve seat bushing 9 having a seat 8 for the main valve, 10. This main valve has a projecting stem that fits within the bore of a guide 11, which guide is held in place in an extension of the valve body by means of a nut 12. The valve 10 is provided with the usual guide wings, and upon the end of these wings is secured a plate 13 with which plate engages the stem 14 of a diaphragm 15, hereinafter mentioned. Functionally, the plate 13 forms a part of the valve 10, and is of a size, relative to the size of the main valve 10, such that fluid rushing through the port of the valve seat bushing 9 and acting upon plate 13 tends to close valve 10. It is only for convenience in manufacture that the plate 13 is formed structurally separate from, though secured to, the valve 10.

It will be noted that since valve 10 is on the inlet side of its seat, the pressure in the inlet chamber of the valve body, which pressure is naturally greater than the pressure in the outlet chamber of the valve body, tends to hold said valve closed. For opening the valve against such pressure I provide in the valve body a diaphragm chamber 16 within which is a diaphragm 15, of relatively large size as compared with the size of valve 10. A cap 17 secured to the valve body holds this diaphragm in place. Perforated threaded plugs 18 and 19, mounted in the valve body between valve 10 and said diaphragm, serve to guide the stem 14. Said stem has at its outer end a head 22, against which the diaphragm 15 is adapted to act. A spring 23 surrounds this stem 14 and bears at one end against the plug 19, the other end of this spring pressing against a shoulder 24 of the stem; whereby said spring tends to press the stem outward or against the diaphragm. The pressure of the inlet chamber of the valve body is arranged to be communicated to the outer side of the diaphragm 15 by means of a port 28 leading to the chamber 29 of a pilot valve 25, and thence, through suitable ports hereinafter mentioned and a duct 37, to the diaphragm chamber 16. The pilot valve 25 is employed, and is adapted, to control the flow of fluid under pressure from the inlet chamber of the valve, to the diaphragm chamber 16, and said pilot valve is arranged to be operated as hereinafter described, by a diaphragm exposed on one side to pressure in the discharge chamber of the valve body, and exposed on the other side to the pressure of a loading spring; and I have further shown, in Fig. 2, additional fluid-pressure-operated valve-control means for opening and closing said pilot valve, independent of variations of pressure in the discharge chamber of the valve body.

It is important to prevent the passage of dirt, scale, and the like, such as may be carried by the steam, into the ports of the pilot valve, and beyond, and therefore I have provided, in the inlet chamber of the valve body, a cylindrical strainer 27 covering the mouth of the port 28. In the wall of the inlet chamber and covered by the said strainer, is an annular groove 26, with which port 28 communicates.

The pilot valve 25 is mounted in a valve seat bushing 33 screwing into a suitable recess provided in the valve body and provided with a bore 35, within which work the guide-wings and stem of the pilot valve 25, said bushing being provided with suitable radial ports 34, connecting the bore 35 with an annular groove 36 formed in the valve body and surrounding the bushing 33; from which groove a duct communicates with the bore of pipe 37 leading to the rear side of the diaphragm 15. The end of the stem of the pilot valve is seated against the central portion of a diaphragm 32, mounted in a suitable recess in the valve body, and held therein by a spring case 38 which screws into the said recess of the valve body. Within this spring case there is a loading spring 42 bearing at one end upon a pressure plate 41 mounted in a chambered hub 40 mounted within the spring case, and itself bearing against the diaphragm 32, the other end of the spring bearing against a bearing plate 43 against which a screw 44, mounted in the end of the spring case, bears. It will be seen that the spring, when under pressure produced by the screw 44, tends to cause the diaphragm 32 to press the pilot valve 25 away from its seat. A duct 30 connects the space in rear of the diaphragm 32 with the discharge chamber of the valve, so that the pressure in the discharge chamber acts against the diaphragm 32 to resist the pressure of the spring 42, and therefore to permit the pilot valve 25 to seat. It will be obvious that the spring 42 may be adjusted to various pressures, by means of the screw 44. A lock nut 45 is provided for holding the screw 44 in any position to which it may be adjusted.

The means whereby my regulating valve is adapted for external control is shown particularly in Fig. 2. A diaphragm casing 47 is arranged to screw into the end of the chamber 29 of the pilot valve, and this diaphragm chamber 47 carries a diaphragm 46 normally resting against the head of a plunger 51, which plunger is mounted in a suitable guide bore of the diaphragm casing 47 the end of the plunger resting against the head of the pilot valve 25. The chamber 50 on the rear side of the diaphragm 46 is connected by a pipe 59 to the inlet chamber of the valve body; and a valve 58 controls the flow through this pipe 59. A spring 60 mounted in a spring case 61, tends to hold the valve 58 closed. Various means may be used for opening and closing the valve 58. I have indicated for the purpose a magnet and armature of the solenoid and plunger type, the plunger 55 adapted to actuate a rod 56, abutting against the end of the stem 63 of valve 58. This valve stem 63 fits rather loosely in the passage in which it is mounted, there being space for the flow of fluid under pressure around said stem 63; and the rod 56 carries a valve 57 which, when the rod is lifted, closes the passage in which valve stem 63 is mounted, while when the valve stem is down and valve 58 is seated, the space surrounding the valve stem is open to the external air through a port 62.

The circuit of the magnet 52 may be controlled by any suitable means, such for example as a hand switch, or a time switch, or a thermostat, or any other type of switch. In Fig. 1 I have indicated a thermostat 54 controlling the circuit of said magnet, and have indicated a battery 53 for supplying current to the circuit. Thermostatic control of the valve is particularly advantageous in many arts, such for example as vulcanizing, pasteurizing, beer treatment, lard melting, etc., as when so controlled the valve is able to control the flow of heating fluid so as to maintain very exactly a predetermined temperature.

The operation of the valve as shown in Fig. 2 is as follows: If the magnet 52 be energized, valve 58 is open, and pressure is communicated from the inlet chamber of the valve, through duct 59 to diaphragm 46, and the area of this diaphragm is ordinarily such that the pressure so communicated is sufficient to hold the pilot valve closed against the pressure of the spring 42. When the magnet 52 is deënergized, valve 58 closes and valve 57 opens, so venting the diaphragm chamber 50 to the air, through vent 62, and, (unless the pressure of the outlet chamber of the valve, communicated through port 30 to diaphragm 32 be sufficient to prevent,) spring 42 causes the pilot valve to open, so permitting fluid under the pressure of the inlet chamber of the valve to pass through ducts 28 and 37 to the rear side of the diaphragm 15, so opening the main valve, 10.

In a companion application for Letters Patent filed October 10, 1911, Sr. No. 653,802 I have illustrated and described a regulating valve comprising a pilot valve bushing similar to the bushing 33 of the valve herein illustrated, and in such companion application have claimed the structure comprising such bushing.

It will be observed that since the main valve 10 is held to its seat by the pressure behind it, except as said valve may be held open by the diaphragm 15, said diaphragm may be removed while valve 10 is under pressure on its inlet side, with perfect safety. Also, the spring case 39 and diaphragm 32 may be removed while the main valve is so under pressure, as may also the valve seat bushing 33 of the pilot valve and the pilot valve itself, also the closure plug 48ª or the diaphragm chamber 47. It is therefore very easy to inspect, clean, and if necessary, replace, the various parts by which the operation of the main valve is effected and controlled, while the valve is in service.

The construction of solenoid magnet and plunger armature for operating valves 57 and 58, illustrated in Fig. 2, is one which I have found particularly suitable, and is illustrated and described and claimed in my Patent No. 1,033,543 dated July 23, 1912.

What I claim is:—

1. The combination in a regulating valve, of a valve body having a flow passage therethrough, a main valve adapted to control flow through such flow passage, fluid-pressure-operated means for operating said valve, a pilot valve controlling the action of said fluid-pressure-operated means, loading means for said pilot valve, fluid-pressure-operated means connected to the service side of the flow passage of said valve body, and arranged to oppose the action of such loading means on the pilot valve, whereby the recited structure is adapted for service as a reducing valve, and means, including distant-control means, adapted to hold said pilot valve closed against the action of said loading means, or, at will, to leave said pilot valve free for operation by said loading means and opposing fluid-pressure-operated means, whereby the recited structure is also adapted for service as a distant-controlled shut off valve.

2. The combination in a regulating valve, of a valve body having an inlet and outlet with a ported division wall therebetween, a main valve seated therein, a diaphragm above the valve, a stem having a head adjacent to the diaphragm for operating the valve, a pilot valve intermediate the valve inlet and the chamber for the diaphragm to control the initial steam pressure to the diaphragm, a second diaphragm and spring for operating the pilot valve, a port leading from the inlet to the pilot valve chamber, a third diaphragm connected to be operated by the initial pressure to close the pilot valve against the action of the regulating spring, a controlling valve intermediate said connections, and means for operating said controlling valve.

3. The combination in a regulating valve, of a valve body having an inlet and an outlet with a ported division wall therebetween, a main valve seated therein, a diaphragm above the valve, a stem having a head adjacent to the diaphragm for operating the valve, a pilot valve intermediate the valve inlet and the chamber for the diaphragm, to control the initial steam pressure to the diaphragm, a second diaphragm and spring for operating the pilot valve, a port leading from the inlet to the pilot valve chamber, a third diaphragm connected to be operated by the initial pressure to close the pilot valve against the action of the regulating spring, a controlling valve intermediate said connections, and a solenoid for operating said controlling valve.

4. The combination in a regulating valve, of a valve body having an inlet and outlet with a ported division wall therebetween, a main valve seated therein, a diaphragm above the valve, a stem having a head adjacent to the diaphragm for operating the valve, a pilot valve intermediate the valve inlet and the chamber for the diaphragm to control the initial steam pressure to the diaphragm, a second diaphragm and spring for operating the pilot valve, a port leading from the inlet to the auxiliary valve chamber, a third diaphragm and case detachably connected with the valve body and connected to be operated by the initial pressure to close the pilot valve, a valve for controlling the steam to the third diaphragm, a further relief valve connected to be opened when the controlling valve is closed to drain the third diaphragm chamber, and means for operating the said controlling valve.

5. The combination in a regulating valve, of a valve body having an inlet and outlet with a ported division wall therebetween, a main valve seated therein, a diaphragm above the valve, a stem having a head adjacent to the diaphragm for operating the valve, a pilot valve intermediate the valve inlet and the chamber for the diaphragm, to control the initial steam pressure to the diaphragm, a second diaphragm and regulating spring for operating the pilot valve and having a port leading from its diaphragm chamber to the service side of the valve, a third diaphragm and case detachably connected with the valve body, pipe connections for operating said diaphragm by the initial pressure to close the pilot valve against the action of the regulating spring, controlling valves intermediate said pipe connections adapted to open and close the connection and to drain the diaphragm chamber when steam is cut off, and means for operating said valves.

6. In a regulating valve such as described, the combination with a valve body, a main valve therein, fluid-pressure-operated actuating means therefor, and a pilot valve controlling the action of such valve actuating means, of main operating means for said pilot valve, and fluid-pressure-actuated operating means for said pilot valve comprising fluid-pressure-actuated means for holding said pilot valve seated, and valve means controlling such fluid-pressure-operated pilot-valve-actuating means.

7. In a regulating valve such as described, the combination with a valve body, a main valve therein, fluid-pressure-operated actuating means therefor, and a pilot valve controlling the action of such valve actuating means, of main operating means for said pilot valve, and fluid-pressure-actuated operating means for said pilot valve comprising fluid-pressure-actuated means for holding said pilot valve seated, and valve means controlling such fluid-pressure-operated pilot-valve-actuating means and a magnet and means operated thereby for operating said last-mentioned valve means.

8. In a regulating valve such as described, the combination with a valve body, a main valve therein, fluid-pressure-operated actuating means therefor, and a pilot valve controlling the action of such valve actuating means, of main operating means for said pilot valve, and fluid-pressure-actuated means for holding said pilot valve seated, and valve means controlling such fluid-pressure-actuated pilot-valve-actuating means, said last-mentioned valve means comprising two valves, one arranged to prevent the passage of fluid under pressure to the fluid-pressure-actuated pilot-valve-actuating means, the other arranged to vent said fluid-pressure-actuated pilot-valve-actuating means.

9. In a regulating valve such as described, the combination with a valve body, a main valve therein, fluid-pressure-operated actuating means therefor, and a pilot valve controlling the action of such valve actuating means, of main operating means for said pilot valve, and fluid-pressure-actuated operating means for said pilot valve comprising fluid-pressure-actuated means for holding the pilot valve seated, said fluid-pressure-actuated pilot-valve-operating means connected to the inlet chamber of the valve body, and valve means controlling the flow of fluid from said inlet chamber thereto.

Signed at Bridgeport in the county of Fairfield and State of Connecticut this 9th day of October A. D., 1911.

GEORGE W. COLLIN.

Witnesses:
C. M. NEWMAN,
I. L. MOREHOUSE.